United States Patent [19]
Scott

[11] 3,810,342
[45] May 14, 1974

[54] DOME JOINT
[75] Inventor: Hollis C. Scott, Portland, Oreg.
[73] Assignee: Western Wood Structures, Inc., Portland, Oreg.
[22] Filed: Dec. 26, 1972
[21] Appl. No.: 318,466

[52] U.S. Cl. ................................. 52/758 R, 52/81
[51] Int. Cl. ............................................. E04b 1/32
[58] Field of Search .......... 52/DIG. 10, 80, 81, 648, 52/86, 665, 758 R

[56] References Cited
UNITED STATES PATENTS
3,486,278   12/1969   Woods .................................. 52/81
FOREIGN PATENTS OR APPLICATIONS
1,194,879   6/1959   France ................................. 52/86

Primary Examiner—John E. Murtagh
Attorney, Agent, or Firm—Klarquist, Sparkman, Campbell, Leigh, Hall & Whinston

[57] ABSTRACT

At both top and bottom of end portions of beams, welded steel plate connector assemblies having side straps are bolted to the beams, a bridge plate welded to the side straps and one or more threaded studs welded to the bridge plate and extending through and nuts tightened behind a facet plate of a separate polygonal hub assembly. The central hub assembly includes a polygonal tube and stiffening plates and gussets in the tube. A clearance between the connector assemblies and the central hub effects a joint where the beam remains in abutment with its facet of the hub for tension forces as well as compression forces. The beams have daps and/or kerfs, and also clearance grooves for the studs to permit the connectors to be slid from retracted positions to positions in which the studs extend through the bolt holes in the hub.

15 Claims, 7 Drawing Figures

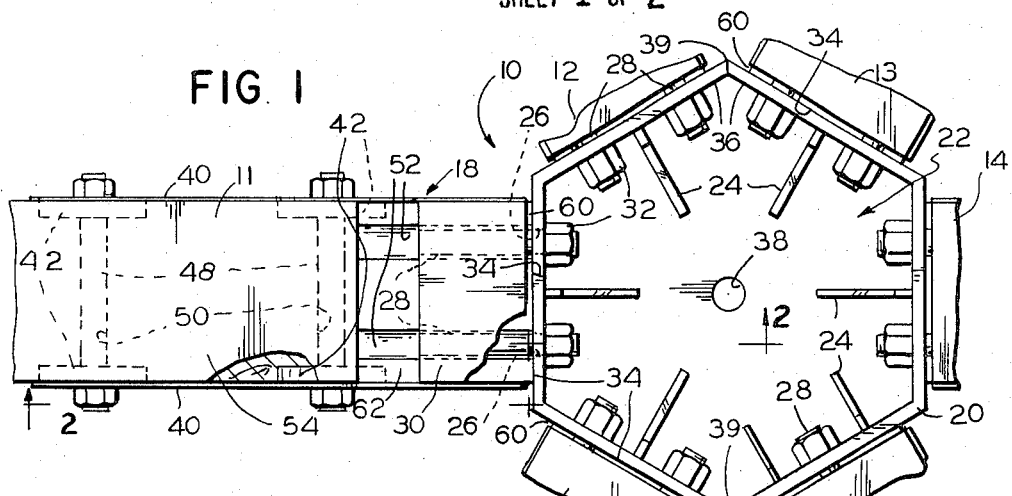

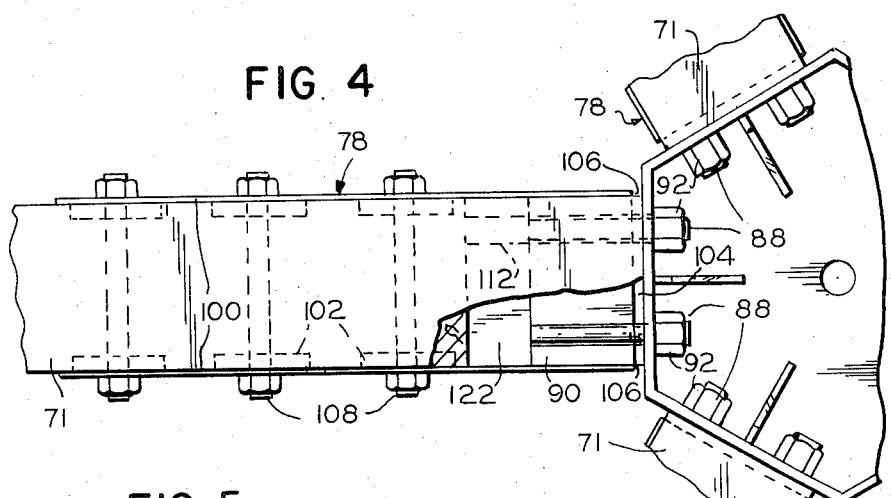
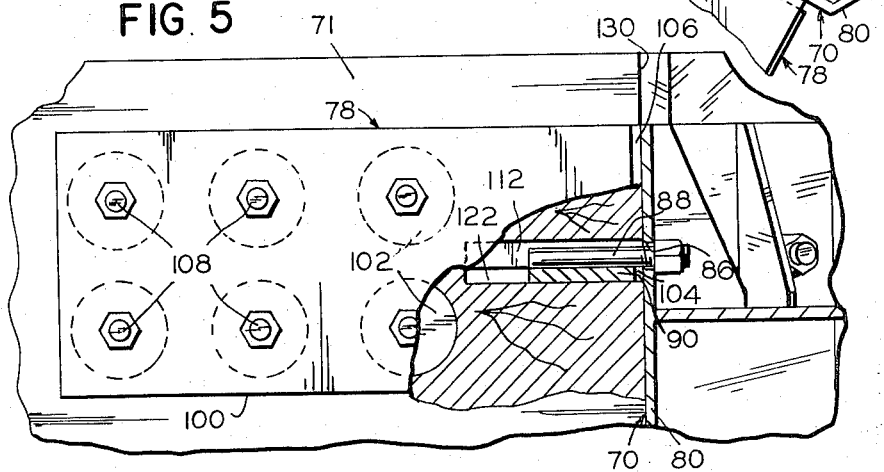
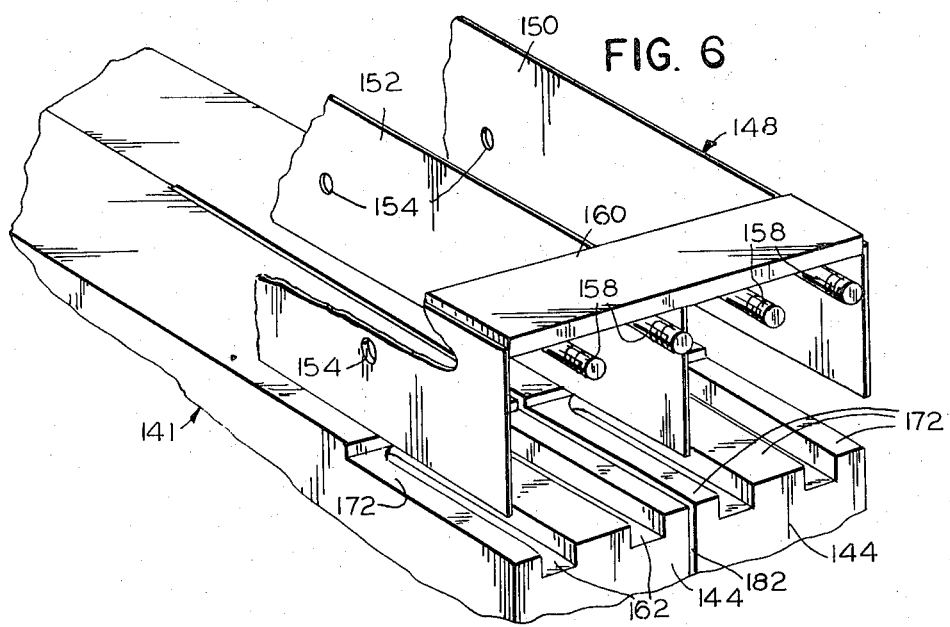

DOME JOINT

DESCRIPTION

This invention relates to a new and improved dome joint, and more particularly to a high strength dome joint with extended strength capabilities.

An object of the invention is to provide a new and improved dome joint.

Another object of the invention is to provide a high strength dome joint.

Another object of the invention is to provide a dome joint which has a high tensile strength as well as a high compression strength.

Another object of the invention is to provide a dome joint that has high shear strength for conducting vertical loads from the beam to the hub assembly.

Another object of the invention is to provide a dome joint that completely eliminates objectionable non-stress movements such as bolt movements in oversize holes when forces change from compression to tension.

A further object of the invention is to provide an easily assembled dome joint.

Another object of the invention is to provide connector assemblies for dome joints which include straps secured to opposite sides of a beam and studs welded to bridge plates integral with the straps.

Another object of the invention is to provide a dome joint hub of polygonal shape.

Another object of the invention is to provide a dome joint in which a beam has a slot or dap and grooves to provide clearance of the bridging plate and studs of connector assemblies having side straps so that the joint can be assembled by sliding the bridging plate and studs along the slot and the grooves to insert the studs into holes in a hub and position the connector for bolting to the beam.

Another object of the invention is to provide a dome joint wherein a connector assembly includes a pair of side plates and a central plate connected by a stud carrying bridge plate in parallel position, the central plate being positioned in a clearance slot between two beams and the side plates bracketing the beam.

Another object of the invention is to provide a dome joint including a connector strap having studs welded thereto.

In the drawings:

FIG. 1 is a fragmentary, top plan view of a dome joint forming one embodiment of the invention;

FIG. 2 is a fragmentary, vertical, sectional view taken along line 2—2 of FIG. 1;

FIG. 3 is a perspective view of a connector assembly of the dome joint of FIG. 1;

FIG. 4 is a fragmentary, top plan view of a dome joint forming an alternate embodiment of the invention;

FIG. 5 is a fragmentary, partially sectional side elevation view of the dome joint of FIG. 4;

FIG. 6 is a fragmentary, exploded, perspective view of a dome joint forming an alternate embodiment of the invention; and, FIG. 7 is a fragmentary, exploded, perspective view of a dome joint forming an alternate embodiment of the invention.

Referring now in detail to the drawings, there is shown therein a dome joint forming a specific embodiment of the invention and including a hub 10 to which wood beams 11, 12, 13, 14, 15 and 16 are connected rigidly for tension, compression and shear by connector assemblies 18. The hub 10 includes a rigid polygonal tube 20 (which may be cylindrical if desired for some domes) and polygonal stiffening discs 22 are welded to the tube with gussets 24 welded to the discs and the sides of the tube. The upper and lower portions of the sides of the tube have one or more bolt holes 26 for receiving one or more studs 28 welded to horizontal bridging plates 30 of the connector assemblies 18, nuts 32 being screwed onto the studs to pull the planar end faces 34 of the beams into abutting engagement with the planar sides of the tube while leaving clearance between the ends of the side plates and the tube and the bridging plates and the tube. Aligned center holes 38 are provided in the discs 22 to receive bolt-like connectors for carrying the joint and beams during installation and, if desired, for fastening other elements to the joint after installation. One embodiment of the tube 20 is composed of two plates bent into generally U-shaped halves 36 welded together along corners 39. Another embodiment is composed of a plurality of plates where all corners are welded together.

Each connector assembly 18 (FIG. 3) includes a pair of longitudinal connecting straps or side plates 40 by which the connector assembly is bolted with or without standard shear plates 42 to the beam. The shear plates 42 fit closely in counterbores 44 in the beams 11 to 16, holes (not shown) in connector assemblies being provided to receive threaded bolts or studs 48 extending through bores 49 in the shear plates and extending through bores 50 in the beams and holding the plates 40 tightly against the sides of the beams. The beams have shallow, filleted clearance grooves 52 in the upper and lower end portions to provide clearance for the long portions of the studs 28 which are welded to the plate 30. The beams have daps 62 for receiving the bridging plates in flush or nearly flush positions relative to top surface 54 and bottom surface 56 of the beam. The lengths of the daps 62 and grooves 52 are such that, during assembly of the dome joint and before the bolts 48 are inserted, the connectors can be in retracted positions sufficiently to the left from the positions thereof shown in FIGS. 1 and 2 for the studs 28 to be completely to the left of the adjacent side of the tube 20 while still aligned with the holes 26. This permits the connector assemblies to be slid to the right from their retracted positions to their operative positions, the studs 28 going through the holes 26 and the holes in the side plates 40 aligning with the bores 50. The bolts 48 then are inserted through holes (not shown) in the side plates and bores 49 and 50 in the wood and shear plates and the nuts are screwed onto the bolts 48. The nuts 32 then are screwed onto the studs 28 to tension the studs 28 to hold the beam tightly against the tube and prevent any shifting of the beam relative to the hub even if the beam should be placed under tension. Clearances 60 between the connector plates 30 and 40 and the tube 20 insure the beam always tightly abuts the hub.

Embodiment of FIGS. 4 and 5

A dome joint forming an alternate embodiment of the invention and designed for heavy wood beams or chords 71 of great depth includes a hub 70 like the hub 10 and having a rigid hexagonal tube 80. Pairs of connector assemblies 78, of which only the upper connector assembly is shown, connect the beams rigidly to the hub for tension, compression and shear. Each connector 78 includes a pair of side plates 100 secured by bolts or studs 108 to the beam, the studs 108 passing through standard shear plates 102. A central bridging plate 90 is welded to the end portions of the side plates, substantially midway between the side edges of the side plates, and fits loosely in a clearance kerf or slot 122. Studs 88 welded to the bridging plate 90 project through holes 86 in the tube 80, and nuts 92 on the studs tension the studs and draw the end of the beam very tightly against the tube 80. Clearances 104 and 106 are provided between the tube and the bridging plate and the side plates, respectively. The studs lie in clearance grooves 112, and the grooves 112 and clearance slot 122 extend sufficiently far to the left that, before the bolts 108 are installed, the entire connector assembly 78 may be retracted to the left of the operative position shown in the drawings sufficiently that the studs 88 are completely to the left of the tube 80 while still aligned with the holes 86. This permits the studs to be inserted merely by sliding the connector assembly 78 to the right from this retracted position. The connector assemblies 78 are of especial value in connecting members subjected to very heavy tension forces. This embodiment may or may not have portions 130 of the wood beams projecting above the hubs.

Embodiment of FIG. 6

A dome joint forming an alternate embodiment of the invention includes a hub (not shown) like the hubs 10 and 80, wood beams 141 and pairs of multiple plate connector assemblies 148. Each beam 141 includes a pair of beam members 144 secured together either with spaced clearance for plate 152 or in abutting, side-by-side positions with daps (shown) for plate 152. Each connector assembly 148 includes side plates 150 and a center plate 152 of the same or similar matching shape and having aligned holes 154 for bolts (not shown) to connect the plates to the hub. A bridging plate 160 welded to the plates 150 and 152 have pairs of studs 158 between each pair of plates 150 and 152 adapted to pass through and be secured to the hub. Daps 172, clearance grooves 162 and a clearance slot or kerf 182 are provided to permit the connector to be retracted sufficiently to permit the studs 158 to completely clear the hub for installation.

Embodiment of FIG. 7

A dome joint forming an alternate embodiment of the invention includes connector assemblies 188 bolted or lag screwed to the tops and bottoms of beams 184 and holding the ends of the beams tightly against a hub (not shown). The connector assembly 188 shown is a top connector and includes an elongated top plate or strap 190, to the end portion of which one or more studs 198 are welded. The strap 190 has holes 192 for bolts or lag screws, and is inset flush in a clearance groove or dap 202, grooves 212 being provided for clearance of the studs 198. The dap and grooves are sufficiently long that, for installation, the connector assembly may be in a slid back or retracted position in which the outer ends of the studs do not project beyond the beam. Then after the beam is positioned in abutment with the hub, the connector assembly is slid along the beam to insert the studs and the strap is bolted to the beam and the nuts are screwed onto the studs. The right hand end of the plate will be spaced somewhat from the hub so that when the nuts of the studs 198 are tightened against the inside of the hole (not shown) the beam is held tightly against the hub.

What is claimed is:
1. In a joint connecting beams together,
   a tubular hub,
   a plurality of beams,
   a plurality of straps secured to the end portions of the beams,
   a plurality of bridge means joining pluralities of the straps together,
   a plurality of threaded fastener means secured to the bridge means and engaging the inner faces of the hub to hold the ends of the beams in abutment with the outer faces of the hub and hold the beams against movement relative to the hub.
2. The joint of claim 1 wherein the fastener means includes bolt members secured to the bridge means and nuts screwed onto the bolt members and engaging the inner face of the hub.
3. The joint of claim 2 wherein the hub has holes through which the bolt members extend.
4. The joint of claim 2 wherein the bridge means includes cross-strap members connecting pairs of the straps and secured to the bolt members.
5. The joint of claim 4 wherein the end portions of the beams have clearance grooves receiving the bolt members.
6. The joint of claim 1 wherein the hub is polygonal.
7. The joint of claim 6 wherein the hub is hexagonal.
8. The joint of claim 1 including stiffening discs in the hub and gussets secured to the hub and the discs.
9. In a dome joint,
   a tubular hub,
   a beam having an end in abutment with one side of the hub,
   a plurality of straps,
   bolt means fastening the straps to the beam in positions extending along the beam with the ends of the straps spaced somewhat from the hub,
   a plurality of studs extending through the hub and along the beam,
   connecting means connecting the studs to the straps,
   and nuts on the studs and tensioning the studs to pull the end of the beam tightly against the hub.
10. The dome joint of claim 9 wherein the connecting means comprises a bridge member connected to the straps for shear and tension and connected to the studs, the bridge member being spaced away from the hub so that only the beam is pulled against the hub.
11. The dome joint of claim 10 wherein the bridge member is a rigid cross plate rigidly secured to the side straps.
12. The dome joint of claim 11 wherein the studs are secured to the plate in positions lying on one face of the plate, the beam having a relieved portion providing clearance for the plate and also having grooves providing clearance for the studs.
13. The dome joint of claim 12 wherein the plate is integral with the straps and the studs, and the relieved portion and the grooves extend away from the end of the beam sufficiently that, before the bolt means are installed, the straps, the plate and the studs can be slid back on the beam to positions in which the studs do not extend beyond the end of the beam so that the straps, the plate and the studs can be slid along the beam to insert the studs through the side of the hub.

14. The dome joint of claim 13 wherein the plate is secured to side edges of the straps and the relieved portion is a dap.

15. The dome joint of claim 14 wherein the plate is secured to the straps inwardly from the side edges of the straps and the relieved portion is a kerf.

* * * * *